United States Patent
Stahmer

(10) Patent No.: US 8,083,215 B2
(45) Date of Patent: Dec. 27, 2011

(54) AIR SPRING DAMPER MODULE

(75) Inventor: Reinhard Stahmer, Garbsen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 851 days.

(21) Appl. No.: 11/812,281

(22) Filed: Jun. 18, 2007

(65) Prior Publication Data

US 2008/0006974 A1   Jan. 10, 2008

Related U.S. Application Data

(63) Continuation-in-part of application No. PCT/EP2005/012275, filed on Nov. 16, 2005.

(30) Foreign Application Priority Data

Dec. 16, 2004   (DE) .......................... 10 2004 060 466

(51) Int. Cl.
*F16F 9/04* (2006.01)
(52) U.S. Cl. .................................................. 267/64.24
(58) Field of Classification Search .... 267/64.23–64.24, 267/64.27, 64.21; 188/322.2; 29/896.93, 29/888.04, 888.044
See application file for complete search history.

(56) References Cited

U.S. PATENT DOCUMENTS

| | | | | |
|---|---|---|---|---|
| 4,712,776 A * | 12/1987 | Geno et al. | ................ | 267/64.21 |
| 5,669,597 A | 9/1997 | Rittstieg et al. | | |
| 6,286,820 B1 * | 9/2001 | Raulf et al. | ................ | 267/64.21 |
| 6,427,986 B1 * | 8/2002 | Sakai et al. | ................ | 267/64.15 |
| 6,585,239 B2 | 7/2003 | Eichhorn et al. | | |
| 2002/0130452 A1 | 9/2002 | Behmenburg et al. | | |

FOREIGN PATENT DOCUMENTS

| | | |
|---|---|---|
| DE | 44 26 243 | 5/1995 |
| DE | 44 01 770 | 8/1995 |
| DE | 197 55 549 | 10/1998 |
| DE | 198 02 703 | 7/1999 |
| DE | 199 59 842 | 6/2000 |
| DE | 103 02 495 | 9/2003 |
| GB | 986 327 | 3/1965 |

* cited by examiner

*Primary Examiner* — Robert Siconolfi
*Assistant Examiner* — Anna Momper
(74) *Attorney, Agent, or Firm* — Walter Ottesen

(57) ABSTRACT

The invention relates to an air spring damper module including a shock absorber (1) and a roll-off piston (5) which is pushed over the upper end of the shock absorber with an opening in the piston base with the piston base being supported on the outer tube (16) of the shock absorber via an annular flange (2). A pipe (15) is centrally fixed to the inner surface of the piston cover (6) and engages around the shock absorber (1) in the mounted state and also is supported on the annular flange (2) of the shock absorber (1). The inner surface of the piston cover and the upper closure of the shock absorber are spaced apart by a gap.

5 Claims, 2 Drawing Sheets

AIR SPRING DAMPER MODULE

CROSS REFERENCE TO RELATED APPLICATIONS

This application is a continuation-in-part application of PCT/EP 2005/012275, filed Nov. 16, 2005, designating the United States and claiming priority from German application no. 10 2004 060 466.5, filed Dec. 16, 2004, the entire content of both applications being incorporated herein by reference.

FIELD OF THE INVENTION

The invention relates to an air spring damper module including: a shock absorber having: an outer tube having a closure at an upper end of the shock absorber with the upper end facing upwardly in the built-in position and an annular flange fixed to the outer tube and spaced from the upper end of the shock absorber; and, a damper rod; a roll-off piston mounted on the upper end of the shock absorber with the roll-off piston having: a piston cover with an outer surface and an inner surface and with a piston base having a central opening; an air spring flexible member mounted and fixed on the roll-off piston, the air spring flexible member having an opening facing away from the roll-off piston and assigned to the roll-off piston; a closure plate closing the air spring flexible member at the opening facing away from the roll-off piston; a stop buffer mounted in the interior of the air spring flexible member with the stop buffer being made of elastomeric material; and, with the roll-off piston being pushed with the opening in the piston base over the upper end of the shock absorber and the piston base being supported via the annular flange on the outer tube of the shock absorber.

BACKGROUND OF THE INVENTION

Air spring damper modules of this kind are primarily in use as spring struts on the forward axles in commercial vehicles. The needed space for mounting the spring and damping in a commercial vehicle is reduced by the coaxial telescopically engaged arrangement of air spring and shock absorber in an air spring damper module. This contributes to a wider spring track (Federspur) and a larger steering angle. The air spring flexible member with the closure plate and roll-off piston acts like an air spring known per se and the operating principle of the shock absorber likewise corresponds to the known state of the art. The shock absorbers are often closed in the built-in state at their upwardly directed ends with a closure plate. This closure plate is held tightly in position, for example, via an interlocking flanged connection of the outer tube of the shock absorber inwardly over the plate. The shock absorber rod is sealed off with a seal with respect to the closure plate. The flanged connection is a purely interlocking connection of the outer tube and the closure plate. The flanged connection is therefore especially sensitive to changing bending loads and plastic deformation.

In a typical embodiment of this type of air spring damper modules, the piston base has a support flange which is mounted on or in the opening of the piston base and is supported on the annular flange of the shock absorber in the mounted state. Furthermore, the roll-off piston mostly has additionally a buffer support which is pushed over the upper end of the shock absorber within the roll-off piston and is likewise supported on the annular flange of the shock absorber via the support flange of the piston base. The stop buffer or an additional spring, which is mounted in or on the closure plate of the air spring flexible member, impacts on an impact plate fixed to the upper end of the buffer support, for example, in the case of a bottoming out of the air spring. This construction functions to protect the roll-off piston at large loads against too great a deformation and to protect the interlocking flanged connection of the shock absorber against loads which are too great. It is disadvantageous that such roll-off pistons are complex, heavy and correspondingly cost intensive.

DE 197 55 549 C2 describes an air spring damper module wherein the roll-off piston lies flat on the upper end of the shock absorber. The total spring force and, in the case of a contact of the stop buffer with the piston cover, also the total buffer force supports itself therefore on the upper end of the shock absorber and the interlocking flanged connection of the outer tube arranged there. An annular flange on the outer tube is not present. In this solution, the closure of the outer tube of the shock absorber is subjected to very high loadings. If the closure is configured as an interlocking flanged connection, leaks and decreased damping power can occur because of the special sensitivity of the interlocking flanged connection with respect to mechanical damage or alternating bending loads.

U.S. Pat. No. 6,585,239 discloses a solution wherein the roll-off piston is spaced from the upper end of the shock absorber and is fixed in a manner not shown and the buffer force is taken up by a protective cover on the rolled end of the shock absorber. The protective cover must be tightly connected to the outer tube so that the protective cover does not separate during operation and to reliably prevent contact with the rolling of the outer tube. In the suggested solution, the assembly of the protective cover on the outer tube is possible only after the assembly of the roll-off piston on the shock absorber. A disassembly of the shock absorber, for example, for the purpose of exchange, is made very difficult or impossible because of the fixedly mounted protective cover.

SUMMARY OF THE INVENTION

It is an object of the invention to provide a constructively simplified air spring damper module of the kind described above wherein the closure of the shock absorber is not touched by the roll-off piston even at high loads while at the same time providing a simple assembly and disassembly of the roll-off piston and the shock absorber.

According to a feature of the invention, a pipe is fixed centrally on the surface of the piston cover which faces inwardly away from the stop buffer. The pipe is in surrounding relationship to the shock absorber in the assembled state and is supported on the annular flange of the shock absorber. The inner surface of the piston cover and the closure of the shock absorber are spaced from each other by a gap.

The closure of the shock absorber remains free of forces of the air spring in all loading situations because of the support of the pipe on the annular flange of the shock absorber. Especially when the closure of the shock absorber is configured with an interlocking flanged connection, this solution ensures a largest possible protection of this flanged connection. A stable support of the piston against transverse forces is achieved via the suitable selection of the inner diameter of the pipe. Furthermore, during operation, a portion of the air spring support forces are directed via the pipe directly to the shock absorber and so relieve the sensitive construction of the piston skirt and piston base.

In a further embodiment of the invention, the pipe is so dimensioned in its axial length that it projects by a predetermined amount beyond the opening of the piston bottom in the assembled unloaded state of the roll-off piston in the built-in condition. This predetermined amount is such that an annular gap remains between the lower edge of the piston bottom and the annular flange and the piston bottom comes in contact with the annular flange only via the operating load of the air spring.

The advantages of this arrangement are the avoidance of a double fit as well as relative movements of the pipe to the shock absorber.

In a further embodiment of the invention, the inner volume of the roll-off piston is connected to the inner volume of the air spring flexible member via at least one opening in the piston cover or pipe.

The advantage of this arrangement is a softer spring characteristic of the air spring.

A further embodiment of the invention is characterized in that the piston cover is configured at least partially as a concave buffer stop surface so that, when the stop buffer impacts on the buffer stop surface, roll-off piston and stop buffer are aligned centrally with respect to each other.

The advantage of this arrangement is that the stop buffer is guided by the concave buffer stop surface. In this way, the danger of buckling of the air spring damper module, for example, by an off center loading, is reduced.

BRIEF DESCRIPTION OF THE DRAWING

The invention will now be described with reference to the drawings wherein.

DESCRIPTION OF THE PREFERRED
EMBODIMENTS OF THE INVENTION

Figure 1:
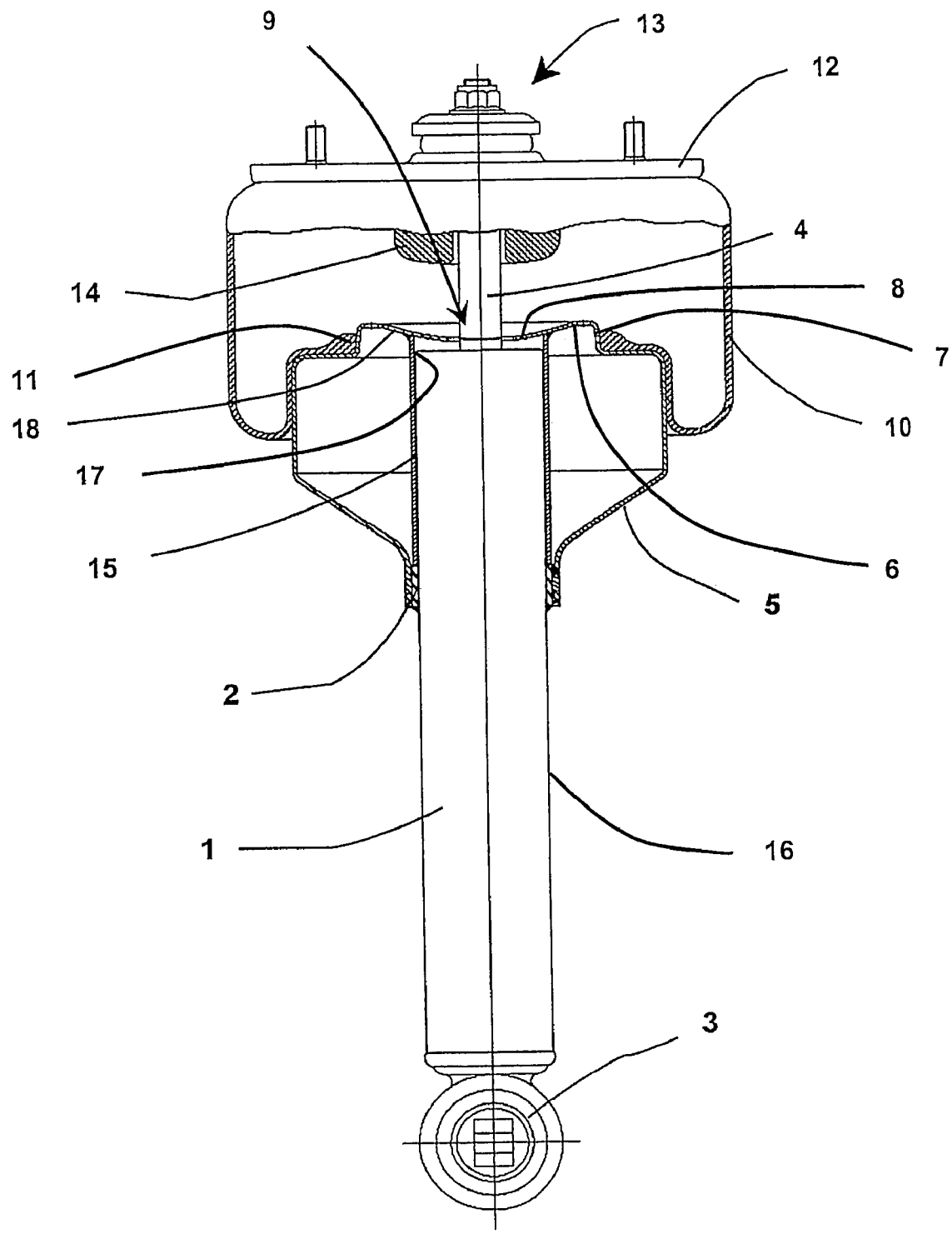
FIG. 1 is a side elevation view, in section, of an air spring damper module according to the invention; and, FIG. 2 is a detail view of the lower portion of the air spring damper module according to another embodiment of the invention.

The air spring damper module shown in FIG. 1 includes a shock absorber 1 having an annular flange 2, an eye 3 for attaching the shock absorber 1 to a body of a commercial vehicle chassis and a damper rod 4. The body and the chassis of the commercial vehicle are not shown. A roll-off piston 5 is placed on the upper end of the shock absorber 1. The roll-off piston 5 is supported on the annular flange 2. The roll-off piston 5 includes a piston cover 6. A conical seat 7 is arranged centrally in the piston cover 6. The conical seat 7 has a perforated buffer stop surface 8 which is arcuately concave in the piston interior. The damper rod 4 is guided via the opening 9 through the buffer stop surface 8.

A rolling-lobe flexible member 10 is placed on the conical seat 7 and this flexible member rolls off on the roll-off piston 5 and, with a sealing bead 11, forms an air-tight connection between roll-off piston 5 and air spring flexible member 10. The air spring flexible member 10 is closed air tight at its upper end with a closure plate 12. A shock absorber support 13 is mounted centrally in the closure plate 12 and the piston rod 4 of the shock absorber 1 is screwed tightly to the support 13. Furthermore, a stop buffer 14 is attached to the closure plate 12 and is directed into the interior of the air spring flexible member. At high loads of the air spring damper module, the stop buffer functions to prevent a direct contact of the closure plate 12 with the roll-off piston 5. If the air spring flexible member 10 deflects beyond the normal operating deflection, then the stop buffer impinges on the buffer stop surface 8 of the roll-off piston 5. A pipe 15 is welded to the inner surface of the buffer stop surface in the roll-off piston 5. The pipe 15 engages around an outer tube 16 of the shock absorber 1 and is spaced radially therefrom. The length of the pipe is so dimensioned that it is seated free of play between the inner surface of the buffer stop surface 8 and the annular flange 2 in the unloaded state. If the stop buffer 14 of the closure plate 12 impacts on the buffer stop surface 8, the buffer force is directed via the pipe 15 and the annular flange 2 into the shock absorber 1. In this way, an interlocking flanged connection 17 of the shock absorber 1 remains free of forces introduced by the air spring in all loading cases. The connecting opening 18 provides a connection of the inner volumes of the roll-off piston 5 and the air spring flexible member 10.

Figure 2:
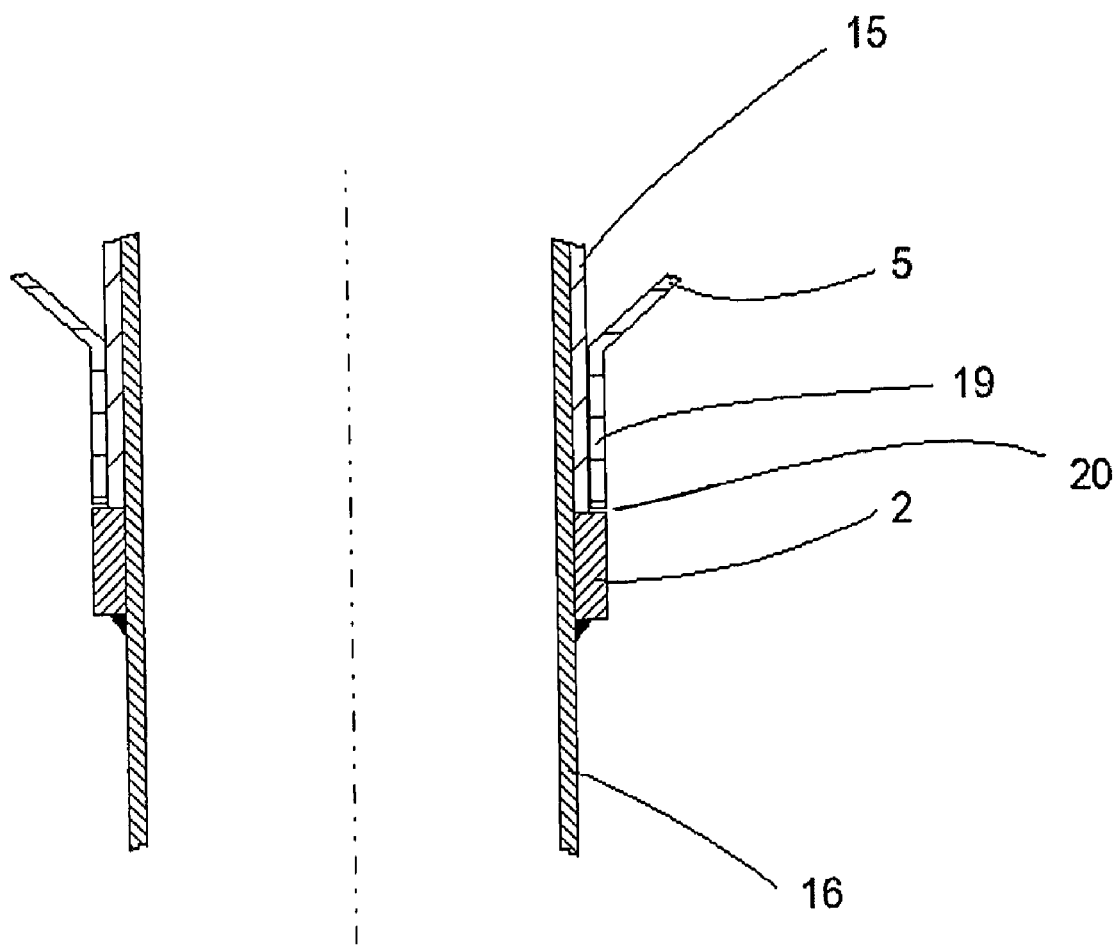

According to another embodiment of the invention, the pipe 15 is so dimensioned in its axial length that it projects outwardly from the opening of the piston bottom 19 by a predetermined amount in the assembled, unloaded state of the roll-off piston 5 in the built-in condition as shown in FIG. 2. The predetermined amount is such that an annular gap 20 remains between the bottom edge of the piston and the annular flange 2 and the piston bottom 19 only comes to lie against the annular flange via the normal operating load of the air spring. When the air spring is under normal operating load, the roll-off piston 5, which is made of steel, bends downwardly somewhat elastically because of the elasticity thereof.

It is understood that the foregoing description is that of the preferred embodiments of the invention and that various changes and modifications may be made thereto without departing from the spirit and scope of the invention as defined in the appended claims.

REFERENCE NUMERAL LIST (Part of the Description)
1 Shock absorber
2 Annular flange
3 Attachment eye
4 Damper rod
5 Roll-off piston
6 Piston cover
7 Conical seat
8 Buffer stop surface
9 Centric opening in the buffer stop surface 8
10 Air spring flexible member
11 Sealing bead of the air spring flexible member 10
12 Closure plate
13 Shock absorber support
14 Stop buffer
15 Pipe
16 Outer tube of the shock absorber 1
17 Interlocking flanged connection
18 Connecting opening
19 Bottom of roll-off piston
20 Annular gap

The invention claimed is:

1. An air spring damper module mountable on a chassis of a motor vehicle, the air spring damper module comprising:
   a shock absorber having, an upper end when in its mounted position in said damper module and including an outer tube having a closure at said upper end;
   said outer-tube having a lower end attachable to the chassis of the motor vehicle;
   an annular flange fixedly attached to said outer tube at a predetermined distance away from said upper end; and, a damper rod;
   a roll-off piston arranged at said upper end of said shock absorber;
   said roll-off piston including a piston cover having an inner surface facing toward said shock absorber and an outer surface defining a buffer stop surface;
   an air spring flexible member having an interior and being attached to said roll-off piston and imparting operating forces thereto during the operation of said air spring damper module;

said air spring flexible member having a first opening assigned to said roll-off piston and a second opening facing away from said roll-off piston;
a closure plate for closing off said air spring flexible member at said second opening thereof;
a stop buffer made of elastomeric material and being arranged in said interior of said air spring flexible member above said buffer stop surface and imparting occasionally occurring impact force to said buffer stop surface during operation of said air spring damper module;
said roll-off piston having a bottom defining a centric opening;
said roll-off piston being pushed over said upper end of said shock absorber with said centric opening;
a pipe fixed centrally on said inner surface of said piston cover so as to be disposed in surrounding relationship to said shock absorber and said pipe having a lower end;
said bottom of said roll-off piston and said lower end of said pipe both being supported directly on said annular flange attached to said outer tube so as to cause all of said operating forces and said impact force to be transmitted directly into said outer tube and then directly into the chassis via said outer tube; and,
said inner surface of said piston cover and said closure of said shock absorber conjointly defining a gap therebetween whereby said closure of said shock absorber remains free of said forces.

2. The air spring damper module of claim 1, wherein said pipe is supported entirely on said annular flange of said shock absorber.

3. An air spring damper module comprising:
a shock absorber having an upper end when in its mounted position in said damper module and including an outer tube having a closure at said upper end; an annular flange fixedly attached to said outer tube at a predetermined distance away from said upper end; and, a damper rod;
a roll-off piston arranged at said upper end of said shock absorber;
said roll-off piston including a piston cover having an inner surface facing toward said shock absorber and an outer surface;
an air spring flexible member having an interior and being attached to said roll-off piston;
said air spring flexible member having a first opening assigned to said roll-off piston and a second opening facing away from said roll-off piston;
a closure plate for closing off said air spring flexible member at said second opening thereof;
a stop buffer made of elastomeric material and being arranged in said interior of said air spring flexible member;
said roll-off piston having a bottom defining a centric opening;
said roll-off piston being pushed over said upper end of said shock absorber with said centric opening and said bottom of said roll-off piston being supported on said outer tube via said annular flange;
a pipe fixed centrally on said inner surface of said piston cover so as to be disposed in surrounding relationship to said shock absorber and being supported on said annular flange;
said inner surface of said piston cover and said closure of said shock absorber conjointly defining a first gap therebetween;
said pipe being so dimensioned in its axial length that it projects outwardly from said opening of said piston bottom by a predetermined amount in the assembled, unloaded state of the roll-off piston in the built-in condition; and,
said predetermined amount being such that a second gap remains between the piston bottom, and said annular flange and the piston bottom only comes to lie against said annular flange when the air spring operates under the normal operating load thereof.

4. The air spring damper module of claim 1, wherein said roll-off piston defines an interior space; and one of said pipe or said piston cover has an opening formed therein to permit said interior space of said roll-off piston to communicate with said interior of said air spring flexible member.

5. An air spring damper module mountable on a chassis of a motor vehicle, the air spring damper module comprising:
a shock absorber having an upper end when in its mounted position in said damper module and including an outer tube having a closure at said upper end;
said outer tube having a lower end attachable to the chassis of the motor vehicle;
an annular flange fixedly attached to said outer tube at a predetermined distance away from said upper end; and, a damper rod;
a roll-off piston arranged at said upper end of said shock absorber;
said roll-off piston including a piston cover having an inner surface facing toward said shock absorber and an outer surface defining a buffer stop surface;
an air spring flexible member having an interior and being attached to said roll-off piston and imparting operating forces thereto during the operation of said air spring damper module;
said air spring flexible member having a first opening assigned to said roll-off piston and a second opening facing away from said roll-off piston;
a closure plate for closing off said air spring flexible member at said second opening thereof;
a stop buffer made of elastomeric material and being arranged in said interior of said air spring flexible member above said buffer stop surface and imparting occasionally occurring impact force to said buffer stop surface during operation of said air spring damper module;
said roll-off piston having a bottom defining a centric opening;
said roll-off piston being pushed over said upper end of said shock absorber with said centric opening;
a pipe fixed centrally on said inner surface of said piston cover so as to be disposed in surrounding relationship to said shock absorber and said pipe having a lower end;
said bottom of said roll-off piston and said lower end of said pipe both being supported directly on said annular flange attached to said outer tube so as to cause all of said operating forces and said impact force to be transmitted directly into said outer tube and then directly into the chassis via said outer tube;
said inner surface of said piston cover and said closure of said shock absorber conjointly defining a gap therebetween whereby said closure of said shock absorber remains free of said forces; and,
said piston cover being configured at least partially as a central concave buffer stop surface so that, when said stop buffer impacts on the buffer stop surface, said roll-off piston and said stop buffer are centrally aligned with respect to each other.

* * * * *

UNITED STATES PATENT AND TRADEMARK OFFICE
CERTIFICATE OF CORRECTION

| | | |
|---|---|---|
| PATENT NO. | : 8,083,215 B2 | Page 1 of 1 |
| APPLICATION NO. | : 11/812281 | |
| DATED | : December 27, 2011 | |
| INVENTOR(S) | : Reinhard Stahmer | |

It is certified that error appears in the above-identified patent and that said Letters Patent is hereby corrected as shown below:

In column 4:
Line 52: delete "having," and substitute -- having -- therefor.

In column 6:
Line 5: delete "bottom," and substitute -- bottom -- therefor.

Signed and Sealed this
Sixth Day of March, 2012

David J. Kappos
*Director of the United States Patent and Trademark Office*